US008556489B2

(12) United States Patent
Cheng et al.

(10) Patent No.: US 8,556,489 B2
(45) Date of Patent: Oct. 15, 2013

(54) LED BACKLIGHT MODULE WITH AIR CONVECTION SPACE

(75) Inventors: Chih-Hua Cheng, Miaoli County (TW); Yi-Ting Chen, Hsinchu County (TW); Yung-Ta Huang, Changhua County (TW)

(73) Assignee: E Ink Holdings Inc., Hsinchu (TW)

( * ) Notice: Subject to any disclaimer, the term of this patent is extended or adjusted under 35 U.S.C. 154(b) by 207 days.

(21) Appl. No.: 13/106,881

(22) Filed: May 13, 2011

(65) Prior Publication Data
US 2012/0224393 A1 Sep. 6, 2012

(30) Foreign Application Priority Data
Mar. 1, 2011 (TW) .............................. 100106708 A

(51) Int. Cl.
*F21V 29/02* (2006.01)
*F21V 7/20* (2006.01)
*G09F 13/08* (2006.01)

(52) U.S. Cl.
USPC ............................ 362/612; 362/97.3; 362/632

(58) Field of Classification Search
USPC ............... 362/612, 615, 621, 632–634, 362/97.1–97.3; 349/62, 64, 65, 67, 69
See application file for complete search history.

(56) References Cited

U.S. PATENT DOCUMENTS

| 2002/0145593 | A1* | 10/2002 | Boyd et al. | 345/173 |
| 2007/0279944 | A1* | 12/2007 | Sakai | 362/633 |
| 2008/0088763 | A1* | 4/2008 | Toriyama et al. | 349/58 |
| 2008/0297687 | A1* | 12/2008 | Watanabe | 349/58 |
| 2010/0073959 | A1* | 3/2010 | Hamada | 362/611 |

FOREIGN PATENT DOCUMENTS

| CN | 101476683 A | 7/2009 |
| CN | 101858514 A | 10/2010 |
| CN | 101865404 A | 10/2010 |
| CN | 101975371 A | 2/2011 |

OTHER PUBLICATIONS
Corresponding CN Office Action that these art references were cited.
* cited by examiner

*Primary Examiner* — Nimeshkumar Patel
*Assistant Examiner* — Steven Horikoshi
(74) *Attorney, Agent, or Firm* — CKC & Partners Co., Ltd.

(57) ABSTRACT

Disclosed herein is an LED backlight module, which includes a metallic plate, a metallic sidewall, a connecting portion, a light guide and an LED ribbon. The metallic sidewall is substantially perpendicular to the metallic plate and located beside a side edge of the metallic plate. The metallic sideplate has a lower edge extending downwards to a position beneath a lower surface of the metallic plate. The connecting portion extends in a direction towards the side edge of the metallic plate from the lower edge of the metallic sidewall, and is further connected to the side edge of the metallic plate. The light guide is disposed above the metallic plate, and the LED ribbon for emitting a light into the light guide is disposed on the metallic sidewall.

10 Claims, 4 Drawing Sheets

LED BACKLIGHT MODULE WITH AIR CONVECTION SPACE

RELATED APPLICATIONS

This application claims priority to Taiwan Application Serial Number 100106708, filed Mar. 1, 2011, which is herein incorporated by reference.

BACKGROUND

1. Field of Invention

The present invention relates to a backlight module. More particularly, the present invention relates to an LED backlight module.

2. Description of Related Art

Along with the progresses of electro-optic technologies, display devices have been widely used in daily life. These display devices are applied in personal digital assistants (PDAs), mobile phones, laptops, monitors and display devices used in cars. Display technologies involve a spontaneous light-emitting type display and a light-receiving type display. The light-receiving type display such as LCD must be equipped with a backlight module as a light source. Therefore, the backlight module directly affects the optical performance of the light-receiving type display.

In general, cold cathode florescent lamps (CCFL), light emitting diodes (LED) or electroluminescence lamps may be used as light sources and applied in backlight modules. LEDs provide several advantages such as small volume, long effective lifetime, low driving voltage, low power consumption, and excellent mechanical strength. Therefore, LEDs have gradually become the main stream among these light sources and replaced the CCFL.

Although LEDs provide many advantages, they have problems in generating a large amount of heat when emitting light. The temperature of LEDs would rapidly increase if the heat generated by LEDs may not be efficiently removed. When the temperature of LEDs rises to a certain valve, LEDs would be damaged.

In the prior art, a fan is arranged to generate a forced convection to remove the heat. However, the fan requires an additional power, and probably generates noise. Therefore, there exists in this art a need of an improved LED backlight that would resolve the aforementioned problems.

SUMMARY

An LED backlight module is provided. The LED backlight module comprises a metallic plate, a metallic sidewall, a connecting portion, a light guide and a light bar. The metallic plate has a side edge and a lower surface. The metallic sidewall is positioned beside the side edge and substantially perpendicular to the metallic plate. The metallic sidewall has a lower edge extending downwards to a position beneath the lower surface of the metallic plate. The connecting portion extends in a direction towards the side edge of the metallic plate from the lower edge of the metallic sidewall, and is further connected to the side edge of the metallic plate. The light guide having a light incident surface is disposed on the metallic plate. The light bar is disposed on the metallic sidewall. The light bar has a plurality of light emitting diodes for emitting light into the light incident surface.

According to one embodiment of the present disclosure, the metallic plate has an area that is greater than one-third of an upper surface of the light guide.

According to one embodiment of the present disclosure, the position of the lower edge of the metallic sidewall is beneath the lower surface of the metallic plate for a distance of about 5 mm to about 30 mm.

According to one embodiment of the present disclosure, there exists a spacing of about 5 mm to about 20 mm between the light bar and the incident surface.

According to one embodiment of the present disclosure, the metallic sidewall and the connecting portion are collectively configured to have a substantially U-shaped cross section or L-shaped cross section.

According to one embodiment of the present disclosure, the metallic plate, the connecting portion and the metallic sidewall are formed as single unitary piece.

According to one embodiment of the present disclosure, the LED backlight module further comprises a heat conductive glue disposed between the light bar and the metallic sidewall. In one example, the LED backlight module further comprises a fastener for bonding the light bar with the metallic sidewall. In another example, the heat conductive glue has a thermal conductivity of greater than about 1.5 W/mK. The fastener may be a screw, and the screw penetrates the light bar.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
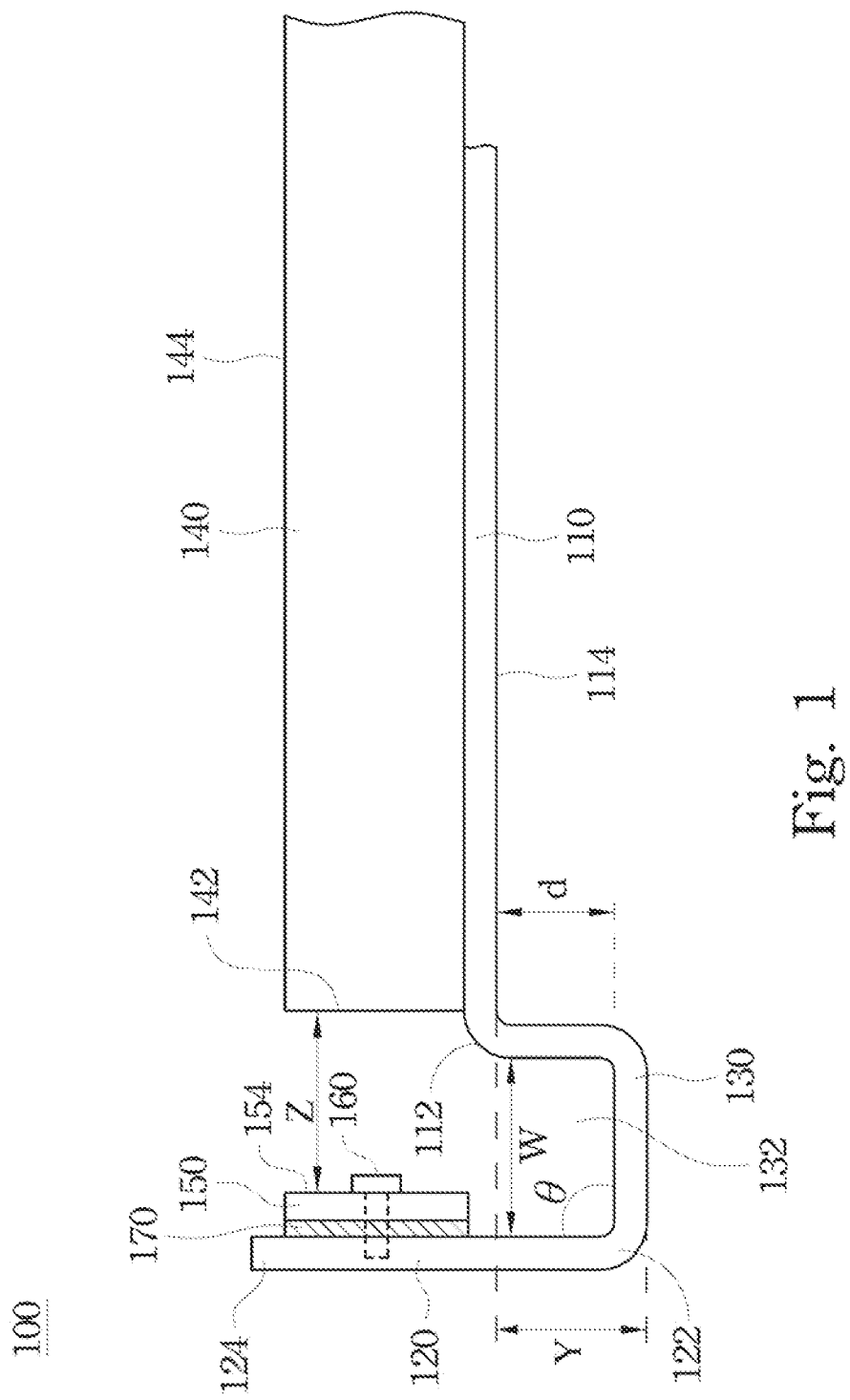
FIG. 1 is a cross-sectional view of an LED backlight module according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

A backlight module, equipped with a plurality of light emitting diodes (LEDs), is disclosed hereinafter. In general, LEDs generate a lot of heat when emitting light. The temperature of LEDs would rapidly increase if the heat generated by LEDs may not be efficiently removed. When the temperature of LEDs rises up to a certain value, LEDs are damaged and the effective lifetime is decreased. Accordingly, the present disclosure provides an LED backlight module with excellent heat dissipation efficiency.

FIG. 1 is a cross-sectional view of an LED backlight module 100 according to one embodiment of the present disclosure. Referring to FIG. 1, the LED backlight module 100 includes a metallic plate 110, a metallic sidewall 120, a connecting portion 130, a light guide 140 and a light bar 150.

The metallic plate 110 is substantially a flat plate, and has a side edge 112 and a lower surface 114. The metallic plate 110 is operable to support the light guide 140 disposed thereon. There is no specific limitation on the thickness of the metallic plate 110, so long as it may provide a desirable mechanical strength. The metallic plate 110 provides a certain area. In one example, the area of the metallic plate 110 is greater than one-third of a light-outputting surface 144 of the light guide 140, which is described in detail hereinafter.

The metallic sidewall 120 is disposed beside the side edge 112 of the metallic plate 110, and is perpendicular to the metallic plate 110. The metallic sidewall 120 is spaced apart from the metallic plate 110, and has a lower edge 122 extending downwards to a position beneath the lower surface 114 of the metallic plate 110. In one example, the lower edge 122 of metallic sidewall 120 extends beyond the lower surface 114 of the metallic plate 110 for a distance of about 5 mm to about 30 mm, as depicted in FIG. 1. In another example, the upper edge 124 of the metallic sidewall 120 extends upwards to a level substantially the same as the light-outputting surface 144 of the light guide 140.

The connecting portion 130 extends in a direction towards to the side edge 112 of the metallic plate 110 from the lower edge 122 of the metallic sidewall 120, and is further connected to the side edge 112 of the metallic plate 110. Therefore, there exists an air convection space 132 between the connecting portion 130 and the metallic sidewall 120. In one example, an angle θ is formed between the connecting portion 130 and the metallic sidewall 120. The angle θ may be, for example, about 60 degrees, 90 degrees, 120 degrees or any other degrees. When the angle θ is about 90 degrees, the metallic sidewall 120 and the connecting portion 130 are collectively configured to have a substantially U-shaped cross section or L-shaped cross section. The shape or profile of the connecting portion 130 is not limited on that illustrated in FIG. 1, so long as the connecting portion 130 may provide an air convection space 132 below the light bar 150.

The metallic plate 110, the metallic sidewall 120 and the connecting portion 130 may be made of a metal with high thermal conductivity for increasing the heat dispassion efficiency. For example, the metallic plate 110, metallic sidewall 120 and connecting portion 130 may be made of aluminum, stainless steel or aluminum alloy. As mentioned above, the metallic sidewall 120 is connected to the metallic plate 110 through the connecting portion 130. The metallic plate 110, metallic sidewall 120 and connecting portion 130 may be formed as single unitary piece by mechanically punching or by bending a metal material. Alternatively, each of the metallic plate 110, metallic sidewall 120 and connecting portion 130 may be provided as an individual part, and then these parts are bonded together by other connecting means.

Figure 2:
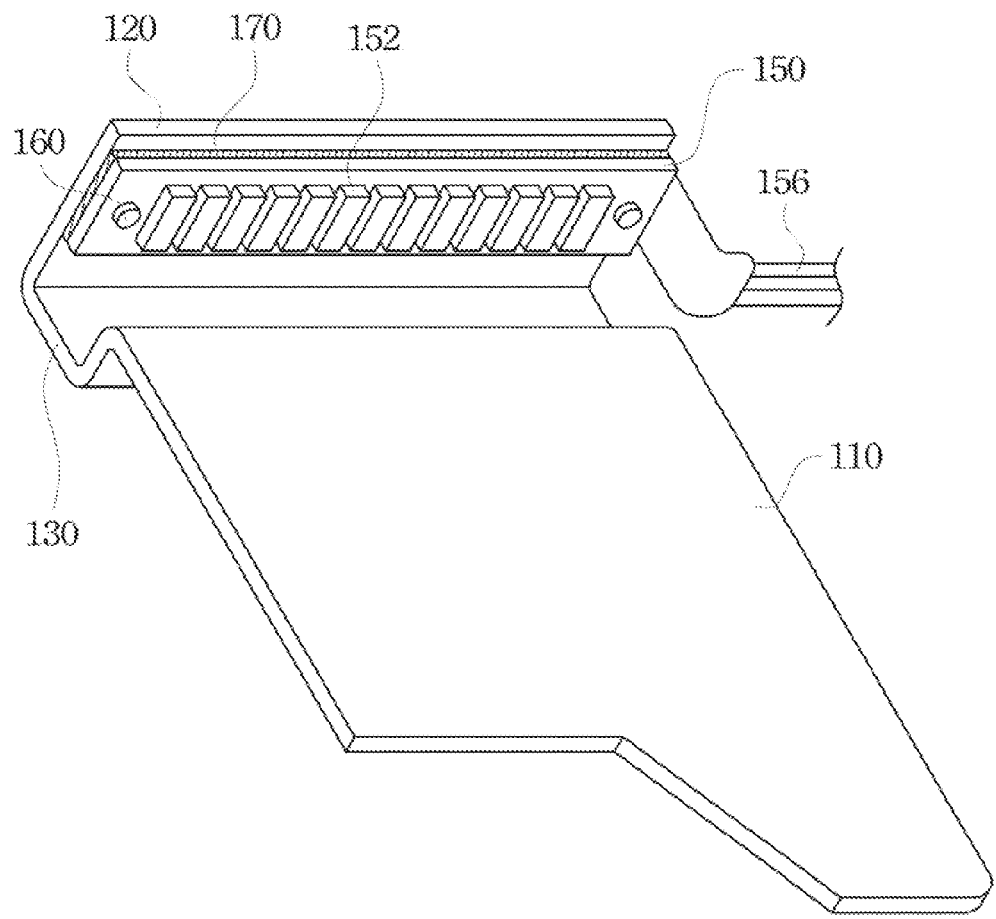
FIGS. 2-4 are perspective views schematically illustrating an LED backlight module according to one embodiment of the present disclosure.

The light bar 150 is for emitting light into the light incident surface 142 of the light guide 140. The light bar 150 is bonded on the metallic sidewall 120, and comprises a plurality of LEDs 152 thereon, as depicted in FIG. 2. The LEDs 152 generate a lot of heat when it emits light. The temperature of LEDs would rapidly increase if the heat may not be efficiently removed. When the temperature of LEDs rises to a certain value, LEDs would be damaged and lose the function.

Figure 3:
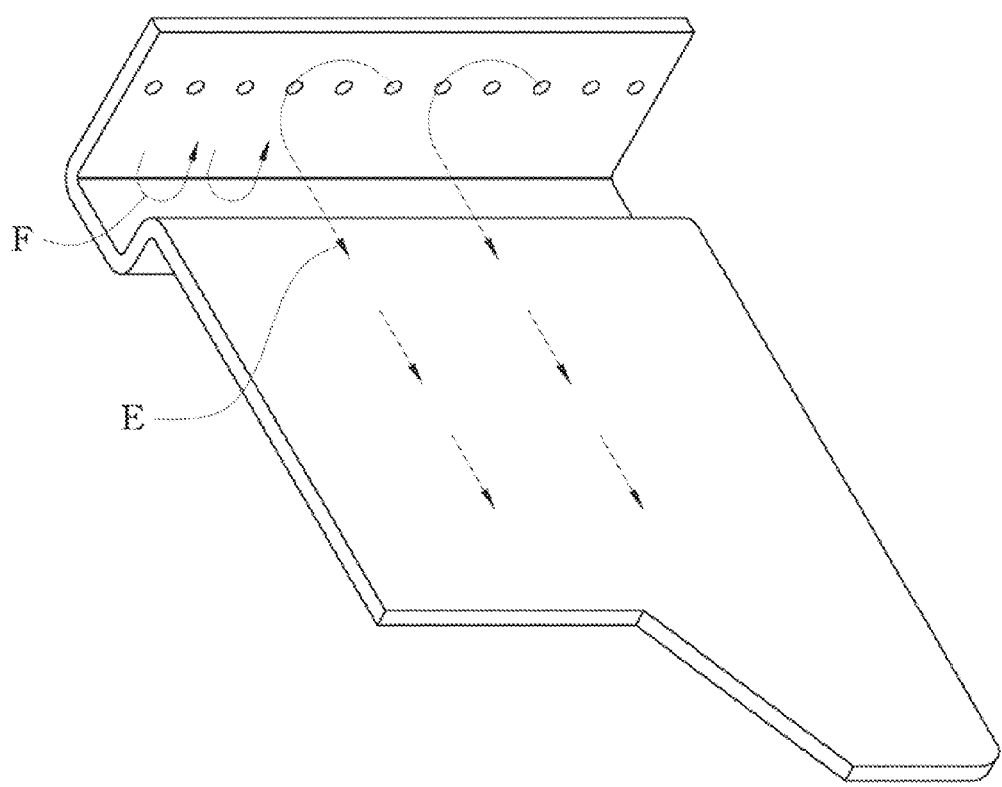

According to the embodiments of the present disclosure, the light bar 150 is bonded with the metallic sidewall 120, and then the heat generated by the light bar 150 may be transmitted to the metallic plate 110 through the connecting portion 130, as illustrated as the arrow E in FIG. 3. The lower surface 114 of the metallic plate 110 provides a desirable area for heat dissipation. The area of the lower surface 114 of the metallic plate 110 may be greater than one-third of the area of the light-outputting surface 144 of the light guide 140, for example greater than one-second or more. Accordingly, the metallic plate 110 may provide a desirable heat dissipation area, and prevent the LEDs from overheating.

The heat resistance at the interface between the light bar 150 and metallic sidewall 120 may dominate the overall efficiency of heat dissipation. If the heat resistance is too high, the heat generated by the light bar 150 may not be effectively transmitted to the metallic plate 110, and thus decreasing the overall efficiency of heat dissipation. Accordingly, in one example, a heat conductive glue 170 is disposed between the light bar 150 and the metallic sidewall 120, as depicted in FIG. 1 and FIG. 2, so that the heat resistance between the light bar 150 and the metallic sidewall 120 may be decreased. The inventor of the present disclosure discovers that the adhesive of the heat conductive glue become weaker when the conductivity of the heat conductive glue is increased. In contrast, the adhesive of the heat conductive glue become stronger when the conductivity of the heat conductive glue is decreased. Therefore, in another example, a fastener 160 may be employed to bond the light bar 150 onto the metallic sidewall 120. For example, the fastener 160 may be a screw and the screw penetrates the light bar 150. By this way, a heat conductive glue with a thermal conductivity of greater than 1.5 W/mK may be used. For example, the thermal conductivity of the heat conductive glue may be about 1.9 W/mK or higher, and the overall efficiency of heat dissipation may dramatically be increased since the heat resistance between the light bar 150 and the metallic sidewall 120 is decreased.

Furthermore, an air convection space 132 is formed below the light bar 150. The air convection space 132 also facilitates to remove the heat generated by the light bar 150. When the temperature of the light bar 150 is increased, phenomena of free air convection are occurred in the space 132, as shown as the arrow F in FIG. 3. The air convection may further remove the heat from the surface of the LEDs, and therefore preventing the LEDs 152 from overheating.

Figure 4:
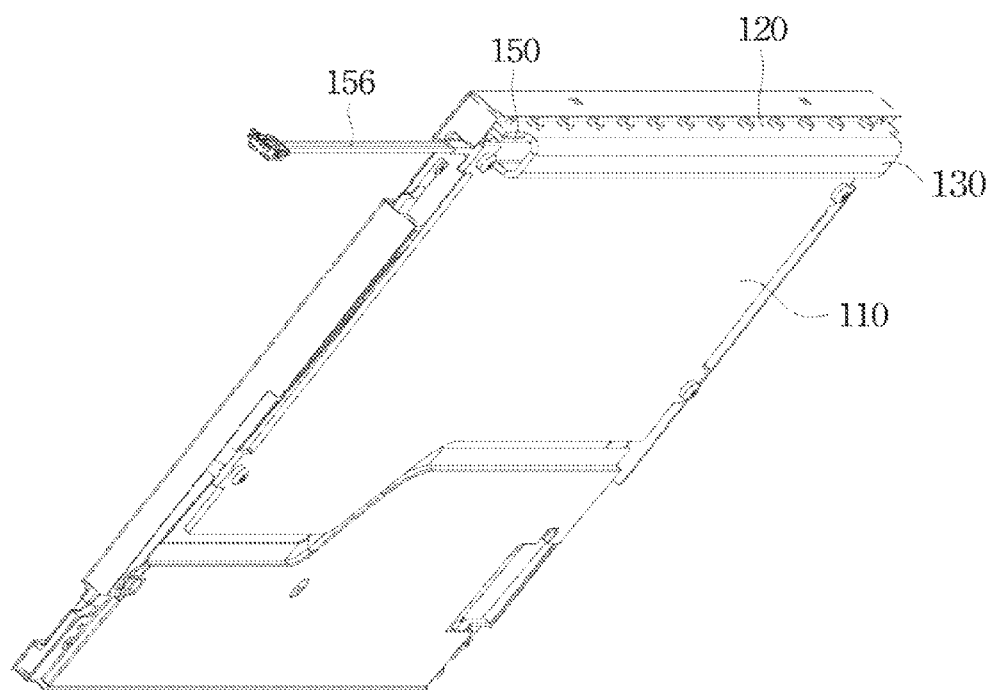

FIG. 4 is a perspective view schematically illustrating an LED backlight module 100 according to one embodiment of the present disclosure. It can be realized that both the metallic sidewall 120 and connecting portion 130 have a significant influence to the whole thickness of the backlight module 100. The volume of the air convection space 132 is dominated by the dimensions of the metallic sidewall 120 and connecting portion 130. Both the thickness and volume of the backlight module 100 are increased as the volume of the air convection space 132 increases. Although increasing the volume of the air convection space 132 may facilitate to remove heat, it suffers the drawback of the increase of the thickness of the entire backlight module, and therefore adversely affects the competitiveness of the product. The inventor of the present disclosure discovers that the effect of air convection only marginally increases when the volume of the air convection space 132 is larger than a certain value. Accordingly, the dimension of the air convection space 132 may be designed in certain values, and therefore provides acceptable results in terms of both the air convection and the thickness of the backlight module. In one example, the depth d of the air convection space 132 (depicted in FIG. 1) is about 5 mm to about 30 mm, for example about 6 mm, about 10 mm, about 16 mm, about 20 mm or about 25 mm. The width W of the air convection space 132 is about 5 mm to about 30 mm, for example about 6 mm, about 10 mm, about 16 mm, about 20 mm or about 25 mm.

In one example, the LED backlight module 100 may further comprise a wire 156 for powering the light bar 150, as depicted in FIG. 2 and FIG. 4. The wire 156 may be connected to the light bar 150 through an opening provided at one side of the air convection space 132.

Referring back to FIG. 1, the light guide 140 is disposed on the metallic plate 110. The light guide 140 has a light incident surface 142 and a light-outputting surface 144. The light incident surface 142 of the light guide 140 faces the light-emitting surface 154 of the light bar 150, and thus the light emitted from the light bar 150 may be transmitted into the light guide 140 through the light incident surface 142. In one example, the distance Z between the light incident surface 142 and the light-emitting surface 154 is about 5 mm to about 20 mm according to the arrangement of the air convection space 132. The light transmitted into the light guide 140 is guided to and exits from the light-outputting surface 144 of the light guide 140.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An LED backlight module, comprising:
    a metallic plate having a side edge and a lower surface;
    a metallic sidewall adjacent to the side edge and substantially perpendicular to the metallic plate, wherein the metallic sidewall has a lower edge extending downwards to a position beneath the lower surface of the metallic plate for a distance of about 5 mm to about 30 mm;
    a connecting portion extending from the lower edge of the metallic sidewall and connected to the side edge of the metallic plate such that an air convection space is formed between the connecting portion and the metallic sidewall, wherein the air convection space has a width of about 5 mm to about 30 mm and a depth of about 5 mm to about 30 mm;
    a light guide having an incident surface and disposed on the metallic plate; and
    a light bar having a plurality of light emitting diodes for emitting light into the light incident surface, the light bar being disposed on the metallic sidewall.

2. The LED backlight module according to claim 1, wherein the metallic plate has an area that is greater than one-third of a light-outputting surface of the light guide.

3. The LED backlight module according to claim 1, wherein there exists a spacing of about 5 mm to about 20 mm between the light bar and the light incident surface.

4. The LED backlight module according to claim 1, wherein the metallic sidewall and the connecting portion are collectively configured to have a substantially U-shaped cross section or L-shaped cross section.

5. The LED backlight module according to claim, wherein the metallic plate, the connecting portion and the metallic sidewall are formed as single unitary piece.

6. The LED backlight module according to claim 1, further comprising a heat conductive glue disposed between the light bar and the metallic sidewall.

7. The LED backlight module according to claim 6, further comprising a fastener for bonding the light bar with the metallic sidewall.

8. The LED backlight module according to claim 7, wherein the heat conductive glue has a thermal conductivity of greater than about 1.5 W/mK.

9. The LED backlight module according to claim 7, wherein the fastener is a screw that penetrates the light bar.

10. An LED backlight module, comprising:
    a metallic plate having a side edge and a lower surface;
    a metallic sidewall adjacent to the side edge and substantially perpendicular to the metallic plate, wherein the metallic sidewall has a lower edge extending downwards to a position beneath the lower surface of the metallic plate;
    a connecting portion extending from the lower edge of the metallic sidewall and connected to the side edge of the metallic plate such that an air convection space is formed between the connecting portion and the metallic sidewall;
    a light guide having an incident surface and disposed on the metallic plate; and
    a light bar having a plurality of light emitting diodes for emitting light into the light incident surface, the light bar being disposed on the metallic sidewall and having a light emitting surface wherein a spacing of about 5 mm to about 20 mm is formed between the light bar and the light incident surface, and a distance between the light incident surface and the light emitting surface is about 5 mm to about 20 mm.

* * * * *